United States Patent

[11] 3,551,741

[72] Inventors Franz Tajbl
Pullach, Isartal;
Max Gillitzer, Munich, Germany
[21] Appl. No. 741,065
[22] Filed June 28, 1968
[45] Patented Dec. 29, 1970
[73] Assignee Linde Aktiengesellschaft
Wiesbaden, Germany
a corporation of Germany
[32] Priority July 4, 1967
[33] Germany
[31] No. 1,615,363

[54] ARC STRIKING OR STABILIZATION NETWORK HAVING A DETECTING TRANSFORMER AND CAPACITOR CONNECTED TO THE ELECTRODE
17 Claims, 6 Drawing Figs.
[52] U.S. Cl. ................................................. 315/209,
315/241, 315/237.1, 328/67, 307/305, 219/69
[51] Int. Cl. ........................................................ H05b 39/02,
H05b 39/04

[50] Field of Search............................................. 219/69C,
69P, 69S; 307/305; 315/237.1, 241, 209; 328/67

[56] References Cited
UNITED STATES PATENTS
3,158,728  11/1964  Webb.......................... 219/69
3,353,062  11/1967  Nuckolls ....................... 315/157

*Primary Examiner*—John W. Huckert
*Assistant Examiner*—B. Estrin
*Attorney*—Karl F. Ross

ABSTRACT: A method of and a circuit for the stabilization of electric arcs and for the ignition of welding or plasma arcs in which a zero-passage detecting transformer is connected across the alternating current input to the arc electrode system and supplies a storage capacitor discharging upon conductivity of a breakdown device to operate a solid-state semiconductor switch (thyristor) to discharge the main storage capacitor and apply the pulse thereof to the arc gap just after zero-passage in the welding alternating current or just before the maximum of the supply current is reached for ignition.

FRANZ TAJBL
MAX GILLITZER
INVENTOR.

BY Karl F. Ross

ATTORNEY

FRANZ TAJBL
MAX GILLITZER
INVENTOR.

BY Karl F. Ross
ATTORNEY

FRANZ TAJBL
MAX GILLITZER
*INVENTOR.*

BY  *Karl G. Ross*

ATTORNEY

3,551,741

ARC STRIKING OR STABILIZATION NETWORK HAVING A DETECTING TRANSFORMER AND CAPACITOR CONNECTED TO THE ELECTRODE

Our present invention relates to a method of and a system for the stabilization of alternating current welding arcs and for the ignition of alternating current and direct current welding arcs between a welding electrode and the workpiece.

It has already been proposed to stabilize alternating current welding arcs, generated between an arc-welding electrode and the workpiece, by superimposing a high frequency alternating current upon the substantially lower frequency welding current to prevent extinguishment of the welding arc at the point at which the welding current amplitude passes through its null or zero value in each alternating current cycle.

It appears that the high frequency voltage superimposed upon the welding current ensures a rapid reignition of the arc as the current amplitude passes through the null value (zero-passage) so that recycling of the arc is unnecessary, thereby stabilizing the arc over the entire period. It has also been proposed to use high frequency alternating current in superimposition upon direct current welding systems to promote ignition of the arc at the initial striking or in place of such striking. An important advantage of such systems is that the electrode may be within 2 to 4 of the workpiece to ignite the arc without any direct contact. Such high frequency current has been generated heretofore by circuits and systems which are not free from disadvantages. For example, a problem frequently arising in these systems is the interference of the high frequency generator with radio communication. Attempts have been made to overcome this particular disadvantage by generating one or more pulses only at the precise instant as which they are necessary, i.e. as the welding current amplitude passes through its null value, and terminating the generation of such pulses when the primary welding current is most effective. However, relatively complex switching arrangements have heretofore been required in arrangements of this type. In addition, they have consumed energy which otherwise might have been used for the welding operation itself. When the arrangements have made use of sparks or arcs to control the pulse generator, the resulting ozone and nitrogen oxide have been found to adversely affect the metal parts of the apparatus unless these parts have been protected against oxidation. As a whole, therefore, prior art techniques have not satisfactorily dealt with the problem of stabilizing alternating current arcs or igniting alternating current or direct current arcs of a welding system.

It is, therefore, an important object of the present invention to provide an improved method of stabilizing alternating current arcs and igniting these arcs and even direct current arcs of a welding system while obviating the aforementioned disadvantages.

Another object of this invention is to provide an improved stabilizing circuit of the character described.

Still another object of the present invention is to provide a circuit arrangement for the stabilization of alternating current welding and plasma arcs, for the ignition of such arcs and for the ignition of direct current arcs, which manifests minimum dissipation of the arc current and is of relatively simple construction but can be used without substantial modification for all of the operative modes described.

We have found that these objects can be attained by a circuit arrangement for applying pulses across the arc gap (usually between a welding electrode and a workpiece) which includes a primary storage capacitor or other charge-storing impedance connected in a discharge circuit with a solid-state controlled rectifier or other semiconductor switching device which is triggered to provide a pulse with a duration of 0.8 to 20 microseconds, preferably 1 to 10 microseconds, across the arc gap; the triggering signal is advantageously derived from a secondary storage capacitor whose discharge, via a voltage-responsive breakdown device, is applied to the control element of the solid-state switch (e.g. a thyristor). An important feature of this invention provides that the discharge circuit include a step-up transformer whose primary winding is connected in series with the thyristor and the primary storage capacitor while the secondary winding is connected across the electrode and the workpiece so that the level of the pulse is augmented without the necessity of dimensioning the controlled rectifier or a primary storage capacitor to withstand such high levels.

The present method differs from prior art systems in that the output pulse applied between the workpiece and the electrode may have an energy of a level well above that of the source because the capacitor may be charged for the balance of the cycle of the basic welding current source. Furthermore, the discharge is independent of the welding current source and does not materially dissipate the welding current. As will be apparent hereinafter, the present system also ensures proper triggering of the discharge without effecting the welding operation itself and indeed the only drain is the insignificant drain required to operate the triggering circuit. The significance of this will be appreciated when it is recognized that conventional pulse producing devices commonly draw 30 kilowatts from the welding source whereas the present system requires only about 1 watt.

According to a more specific feature of this invention, the triggering circuit includes a detecting transformer responsive to the zero-passage of the waveform of the welding source and having its primary winding connected across the latter together with an isolating capacitor and a choke whose functions are described hereinafter. The secondary winding of the detecting transformer is connected in series with a current limiting variable charging resistor across the secondary capacitor, thereby forming the charging circuit therefor. The discharging circuit of this capacitor is formed by a time-constant network whose condenser is bridged by a bleeding resistor and is interposed between the secondary storage capacitor and a breakdown device. The latter is rendered conductive as the voltage applied across the gap rises upon quenching of the arc and discharges the secondary storage capacitor through a further current limiting resistor to form the triggering pulse.

Advantageously, the triggering pulse released by the breakdown device, preferably a glow tube, zener diode or the like, is applied to the primary winding of a pulse transformer whose output side feeds a rectifier which, in turn, is connected to the gate of the thyristor or, where a number of thyristors are provided in oppositely poled orientation, to the gates thereof; in the latter case, individual rectifiers may be employed.

Still another feature of this invention resides in the provision of a charging circuit for the primary capacitor which includes an isolating transformer whose primary winding is connected to line current between a switch and a transformer serving as the aforementioned source. In the output transformer of the discharge circuit of this capacitor, a diode is placed in shunt across the primary winding and is poled oppositely to the semiconductive switch.

The above and other objects, features and advantages of the present invention will become more readily apparent from the following description, reference being made to the accompanying drawing in which.

GENERAL DESCRIPTION

Figure 1:
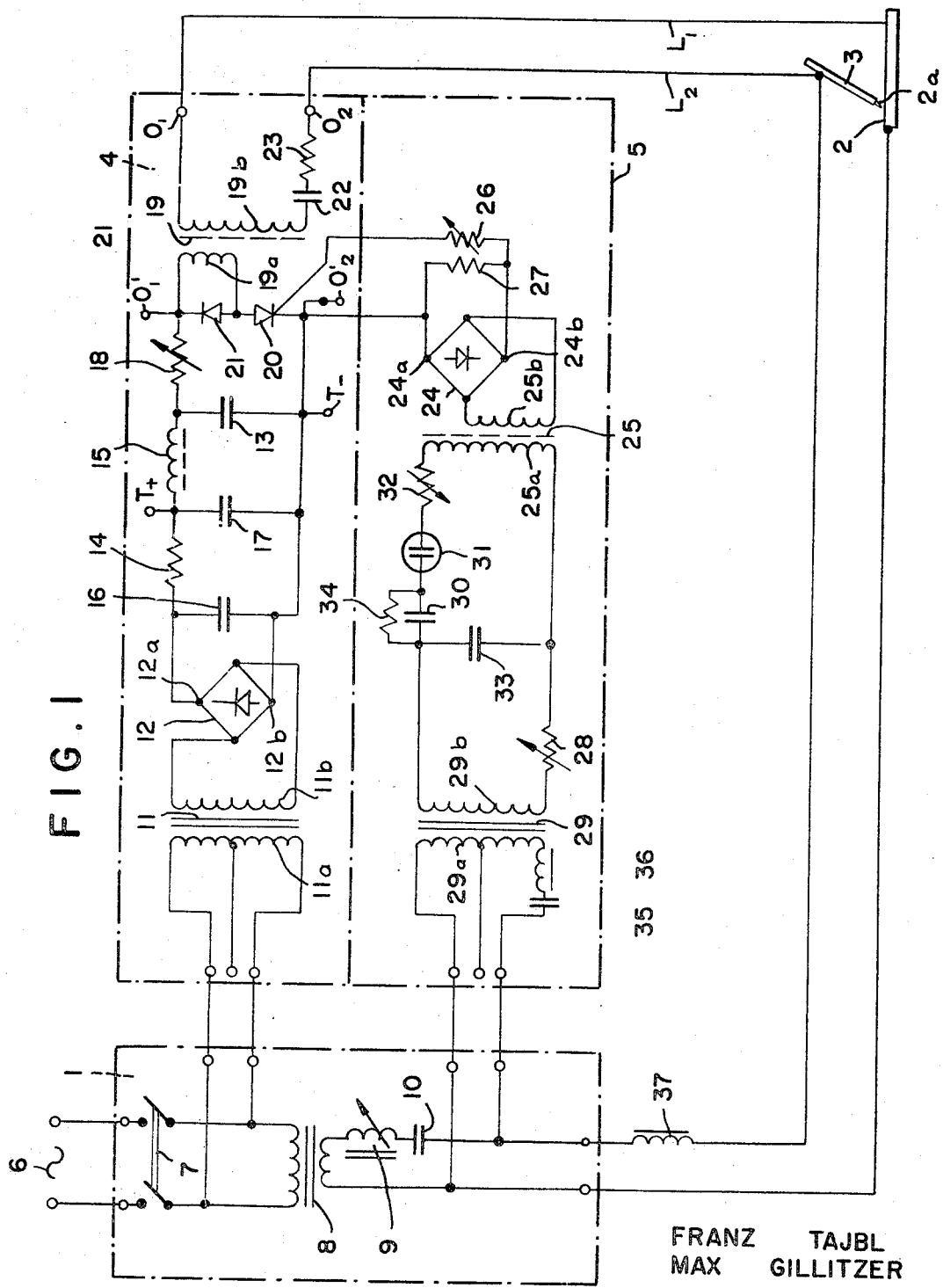
FIG. 1 is a schematic diagram of a circuit for the stabilization of an alternating current welding arc.

In FIG. 1, we show a basic circuit for control of the welding current applied across the welding electrode 3 which is spaced from the workpiece 2 across the arc-welding gap 2a. The system basically comprises a welding current source 1, a pulse generator 4 and a control circuit 5 for triggering the pulse generator. The welding current source 1 is energized by the line source 6 of 50 or 60-cycle alternating current and includes a double-pole single-throw switch 7 connected between the source 6 and a welding transformer 8 of the stepdown type. The switch 7 is connected to both sides of the primary winding of this transformer. The welding current may be adjusted by a variable inductance represented at 9 (e.g. a saturable reactor or an adjustable auto transformer, the inductance 9 being connected in series with a surge-suppressing filtering capacitor 10.

Between the switch 7 and the primary winding of transformer 8, we connect the pulse generator 4 to the line current network via an isolating transformer 11 whose secondary winding 11a is connected to the input terminals of a full wave rectifier bridge 12. A smoothing network consisting of a pair of filer capacitors 16 and 17 is bridged across the output terminals 12a and 12b of the rectifier 12; a resistor 14 and a choke 15 is provided between the bridge 12 and a storage capacitor 13 from which the pulse energy is derived. Choke 15 acts as a charge-controlling impedance in the charging network of the capacitor 13 and also serves to limit reverse current surges while resistor 14 acts as a smoothing impedance together with the smoothing capacitors 16 and 17 of the filter.

The discharge circuit in which the capacitor 13 is connected includes a freewheeling 21 poled oppositely to a silicon (solid state) controlled rectifier or other controllable semiconductive switch device as represented by the thyristor 20, the rectifier diode 21 and the controlled rectifier 20 being connected in series with a variable resistor 18 across the capacitor 13.

It will be understood that the charging circuit for the storage capacitor 13 can be replaced by a battery (see FIG. 1a) or other direct current source independent of the line 6. In this event, the isolating transformer 11, the rectifier bridge 12 and the filtering network 14, 16, 17 can be avoided. This expedient is best employed when the space available for the pulse output device 4 is meager in the region of the welding zone. In that case, the terminals T+ and T— can be connected via relatively long leads to the DC source (e.g. a battery) which can serve a number of output networks 4 and their respective welding stations.

The output side of the discharge network includes a pulse forming transformer (output transformer 19) which serves to isolate the pulse forming network from the welding system 2, 3 and to inductively couple the pulse forming network to the latter. The primary winding 19a of this transformer is bridged across the diode 21 which shunts or short circuits the input side of the transformer for passage of pulses of one polarity while blocking the short circuit and effectively connecting the primary winding 19a in circuit with the anode-cathode terminals of the controlled rectifier 20. The latter functions analogously to a thyratron tube and will be referred to hereinafter as a thyristor.

The secondary winding 19b of the output transformer 19 is bridged across the welding electrode 3 and the workpiece 2 in series with an isolating capacitor 22 and a current limiting resistor 23. The pulse transformer 19 can be dispensed with, in which case the discharge storage capacitor 13 is coupled directly across the electrode 3 and the workpiece 2 by, for example, connecting the $L_1$ and $L_2$ to output terminals $0'_1$ and $0'_2$ instead of the output terminals $0_1$ and $0_2$ of the transformer 19. The use of an output transformer, however, has the advantage that it may be, as shown, a stepup transformer, thereby obviating the necessity of designing all of the circuitry of the pulse forming unit 4 with high-voltage output capability.

The triggering network for the thyristor 20 comprises a full wave rectifier bridge 24 whose output terminals 24a and 24b are connected across a load resistor 27 and to the anode and gate terminals of the thyristor 20 via a variable resistor 26. A stepdown transformer 25 has its secondary winding 25b connected to the input terminals of the bridge 24 and a primary winding 25a energized via a breakdown device 31 which will be described in greater detail hereinafter.

It will be understood that, in place of the full wave rectifier bridge 24, a pair of counterconnected unidirectional diodes may be employed to effectively double the output pulse frequency by reversing every other half cycle generated at the transformer 25. The pulse source comprises a transformer 29 whose primary winding 29a is connected to the output side of the stepdown transformer 8 between the variable inductance 9 and its filtering capacitor 10 and the electrodes 2, 3 so that the timing pulses delivered to the transformer 29 are in the cadence of the welding pulses. The output or secondary winding 29b of the transformer 29 is connected to the primary winding 25a of transformer 25 in series with the voltage-dependent switching element or breakdown device 31 such as a glow tube, a zener diode, a voltage stabilizing or VR tube or even a transistor, double-base diode or unijunction transistor.

The control circuit also includes a storage capacitor 33 connected across the secondary winding 29b of transformer 29 in series with an adjustable resistor 28 determining the charging rate of the capacitor 33. An isolating capacitor 30 is connected between the secondary winding 29b and its capacitor 33 and the glow tube 31 while a discharge resistor 34 is shunted across the capacitor 30 to form a discharge-controlling time constant network therewith. A current limiting resistor 32 is in series with the glow tube 31 and the primary winding 25a of control transformer 25.

The primary winding 29a of transformer 29 is connected in series with an isolating condenser 35 and a blocking choke 36. A number of taps are provided at the transformer 29 to allow the system to accommodate various input voltages. In series with the electrode 3 and the welding transformer 8 and behind the connection of the control unit 5 therewith, we provide an iron-core choke 37.

OPERATION

A. Stabilization of an Alternating Current Welding Arc

The primary winding of transformer 11a is connected to the alternating current source 6 via the switch 7 with the alternating current output of transformer 11 converted into full wave raw-rectified direct current at the output terminals 12a a and 12b of this bridge. Any perturbations and of this direct current are eradicated by the filter network 14—17 so that the current supplied to the capacitor 13 on charge is substantially pure, smooth and ripple-free direct current. Capacitor 13 is thus fully charged.

The impulsive discharge of the capacitor through the variable resistor 18, the primary winding 19a of transformer 19 and the thyristor 20 is effected at the instant in which a control pulse is delivered to the gate of the thyristor 20 from the control unit 5. This control pulse is applied immediately after the welding current waveform passes through the zero amplitude stage, i.e. immediately after the current amplitude at the electrodes has reached null (zero passage).

Thyristor 20 remains conductive for the duration of the discharge of the capacitor 13 while choke 15, together with the momentary current flow reversal upon completion of the discharge, ensures quenching of the thyristor 20 and the switching of the latter into its nonconductive condition. Charging of the capacitor 13 for the next cycle begins immediately. The duration of discharge of the capacitor 13 depends upon the impedance of this capacitor and the resistivity of its discharge network including the impedance of transformer 19, the resistor 18 providing a fine adjustment of the discharge time constant. Best welding results have been found when a pulse width of 1 to 10 microseconds is delivered by the capacitor and the thyristor 20.

The discharge pulse generated by the storage capacitor and the thyristor 20 is amplified in the transformer 19, attenuated only slightly in the network 22, 23, which blocks DC reverse surges, and applied via leads $L_1$ and $L_2$ across the electrode and the workpiece 2, 3. Capacitor 22 isolates the transformer 19 from the welding current circuit while the iron-core choke 37 prevents dissipation of the pulses from the pulse generator 4 in the welding current source.

The current pulses superimposed upon the electrode 3 and workpiece 2 may have an amplitude of about 10 amperes and, using the step of transformer 19, the pulses may have a peak voltage of 300 to 5,000 volts adjustable via taps or by adjustment of the frequency. The lower value is preferred for welding in the region of homes and the like which would be adversely affected by radio and television interference signals while the upper voltage ranges may be employed, for example, in automated plasma welding and cutting installations, in submerged-arc systems and the like. For these outputs, the thyristor 20 may be energized with direct current pulses of a voltage level of 40 to 1,000 volts at currents of 40 to 400 amperes.

Figure 2A:
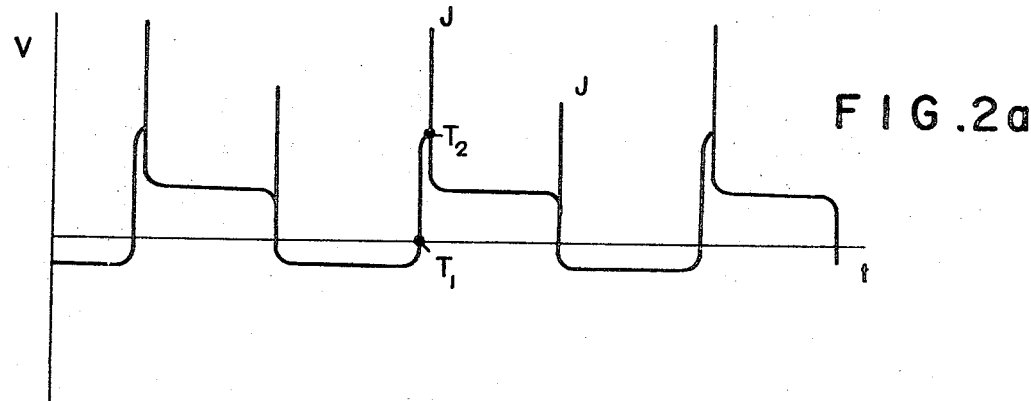
FIG. 2a is a graph (voltage amplitude plotted along the ordinate against time along the abscissa) showing the voltage developed between electrode and workpiece during the process.

The welding voltage across the electrode 3 and the workpiece 2 actually has, during the welding process, the substantially rectangular waveform illustrated in FIG. 2a. Immediately after the null transition (zero passage) of the welding voltage (represented at $T_1$ of the graph), i.e. directly after quenching of the arc, the voltage pulse reaches its maximum amplitude or value. This sharp increase in voltage across the electrodes with extremely steep flank is sensed by the control circuit 5 and triggers at $T_2$ a pulse represented at $i$ and occurring directly after zero passage of the alternating current welding voltage as shown in FIG. 2a. This pulse reignites the arc and ensures such reignition at each cycle. From FIG. 2a it can also be seen that the arc does not extinguish during the zero passage from the positive half cycle to the negative half cycle. This condition first arises some time after commencement of welding when the electrode is relatively hot.

Figure 2B:
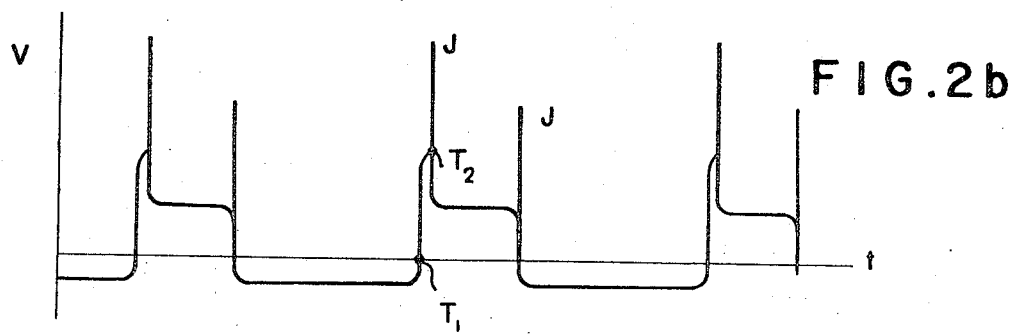
FIG. 2b is a graph of another voltage relationship.

In FIG. 2b, we show the amplitude of the welding voltage of an alternating current arc-welding system upon which a direct current potential is superimposed in the conventional manner. This superimposition is designed to reduce the duration of the positive half cycle relative to the negative half cycle (FIG. 2b). The special significance of the present invention in this case will be apparent from the fact that also here the pulse $i$ is produced at the precise time $T_2$ at which it is required for reignition of the welding arc and for assuring a stable arc even though the period between the zero-passage from negative to positive half cycle and the zero-passage from positive to negative half cycle may be shorter than the period between the zero-passage from positive to negative half cycle and the zero-passage from negative to positive to positive half cycle (at which the pulse is triggered).

The alternating current potential across the electrode 3 and the workpiece 2 is thus used to trigger the control circuit 5 via the transformer 29 which has the isolating condenser 35 in its primary circuit to function as a DC-blocking impedance preventing passage of the direct current component of the welding current through the zero-passage detection network constituted by the transformer 29. In addition, the isolating condenser 35 prevents erroneous operation of the pulse generator as a result of a perturbation in the DC source. The blocking choke 36 protects the primary network of the zero-passage detector 29 from transients.

As noted, the potential across the electrode 3 and the workpiece 2 and the potential across the primary winding 29a of transformer 29 rises rapidly upon zero-passage of the applied voltage and quenching of the arc; consequently, the control storage capacitor 33 is rapidly charged at a charging time determined by the impedance of the secondary winding 29b and the variable resistor 28. The glow tube 31, which remains in its nonconductive condition during charge, prevents drain of the capacitor 33 during this interval. Thus the voltage across the glow tube 31 also builds up rapidly until its breakdown voltage or threshold is reached. At this point, the breakdown device 31 becomes conductive and a pulselike discharge of capacitor 33 is effected through the breakdown device 31 and the primary winding 25 of the control-pulse transformer 25 and the current limiting resistor 32. The pulse duration continues until the time-constant network 30, 34 has its capacitor 30 charged. The current flow through the primary winding 25a is terminated at this instant and the glow tube 31 quenched. The voltage capacitor 30 is bled off by the resistor 34, thereby preparing the pulse triggering circuit for the next cycle.

The output of transformer 25 is used to trigger the thyristor 20 over the full wave rectifier 24 and the adjustable resistor 26, the signal being applied to the gate of the thyristor to generate an amplified pulse across the electrode 3 and the workpiece 2 as previously described.

Figure 1A:
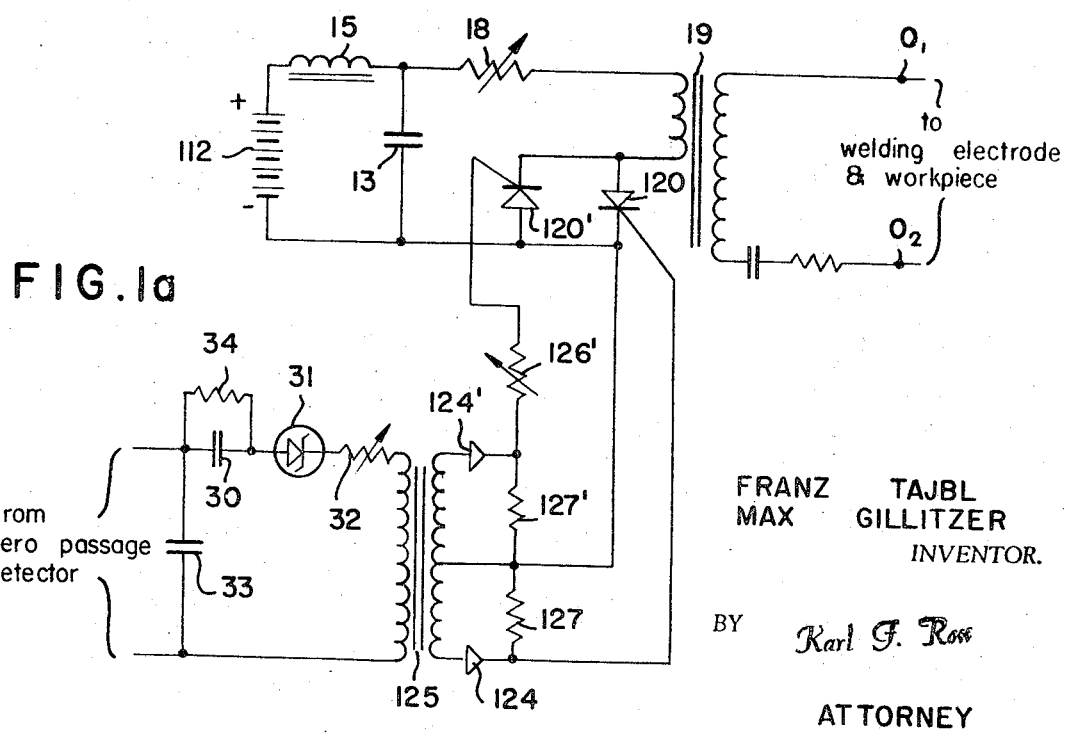
FIG. 1a is a fragmentary of an alternative current.

Another embodiment of this invention is shown in FIG. 1a in which a zener diode 131 has replaced the glow tube 30 in the primary circuit of the pulse transformer 125. In addition, the DC source 11, 12, 14, 16 and 17 has been replaced by a battery 112. In this embodiment, a plurality of controllable semiconductive devices (e.g. two solid state controlled rectifiers 120 and 120') are employed. The controlled rectifiers 120 and 120' are poled oppositely to one another while the rectifier bridge 24 is replaced by a pair of unidirectional rectifiers, i.e. rectifier diodes 124 and 124', each connected with a respective secondary winding of the pulse transformer 125 via the load resistors 127, 127' and the variable current limiting resistors 126 and 126'. Otherwise, the circuit applies pulses of alternate polarity across the electrode 3 of the workpiece 2 and is desirable when the arc stabilizing pulses must have the same polarity as the welding half cycle upon reignition. Surprisingly, this has not been found to be the case in most situations and practically identical stabilization is obtained when the pulses applied across the electrode 3 and the workpiece 2 are of only one polarity. It is desirable to choke off any reverse current surges of oscillations in the discharge circuit of the storage capacitor 13 after the generation of the pulse and we have found that this is best done by shunting the primary winding of transformer 19 with a diode 21 (FIG. 1). In this manner, in spite of the unavoidable inductance phenomenon in the welding circuit and the tendency toward oscillation, only single-polarity pulses are generated, two such pulses being applied during each period of the alternating current weld operation.

B. Ignition of Alternating Current Welding Arc

Figure 3:
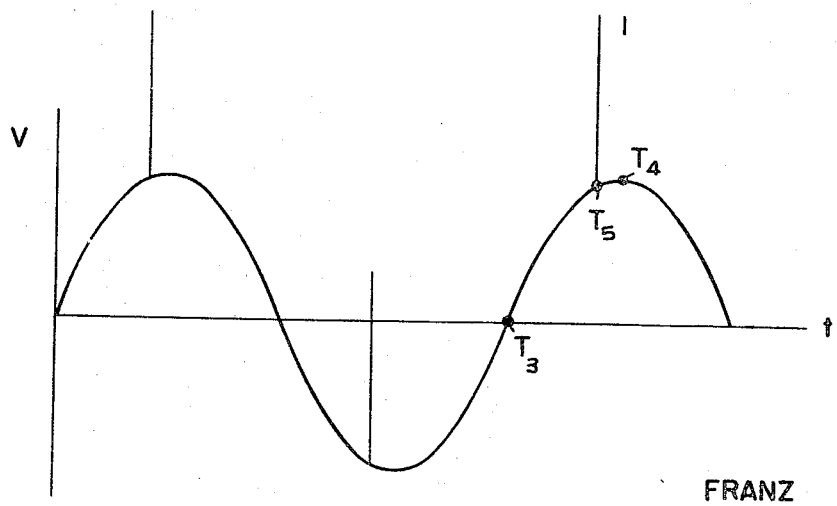
FIG. 3 is a graph of the no-load source voltage of the alternating current for the welding process.

The previously described device may be used, as has been noted, without substantial modification for the ignition of welding arcs. Prior to ignition of the arc, the welding voltage applied across the electrode 3 and the workpiece 2 has the wave form illustrated in FIG. 3. The voltage rises after zero-passage relatively slowly in accordance with the sign wave and reaches the maximum $T_4$ only after a multiple of the time span $T_2 - T_1$ becomes conductive much later in the case in which the system is used for the initial ignition of the arc than when the glow tube is used to trigger pulses during the course of arc welding. The control pulse for the thyristor 20 (FIG. 1) and, therefore, the applied pulse across the electrode 3 and the workpiece 2 occurs, as is schematically illustrated in FIG. 3, at I, is produced only at some time after the zero-passage $T_3$ of the alternating current voltage, i.e. at $T_5$, which is very close to the desirable maximum voltage $T_4$ at ignition. In other words, at the point $T_5$, the nonload voltage applied by the welding source across the electrode 3 and the workpiece 2 suffices to cause breakdown of the glow tube 31 and, therefore, application of the pulse of circuit 4 substantially simultaneously with the maximum of the welding pulse and ignition.

C. Ignition of Direct Current Welding Arc

Figure 4:
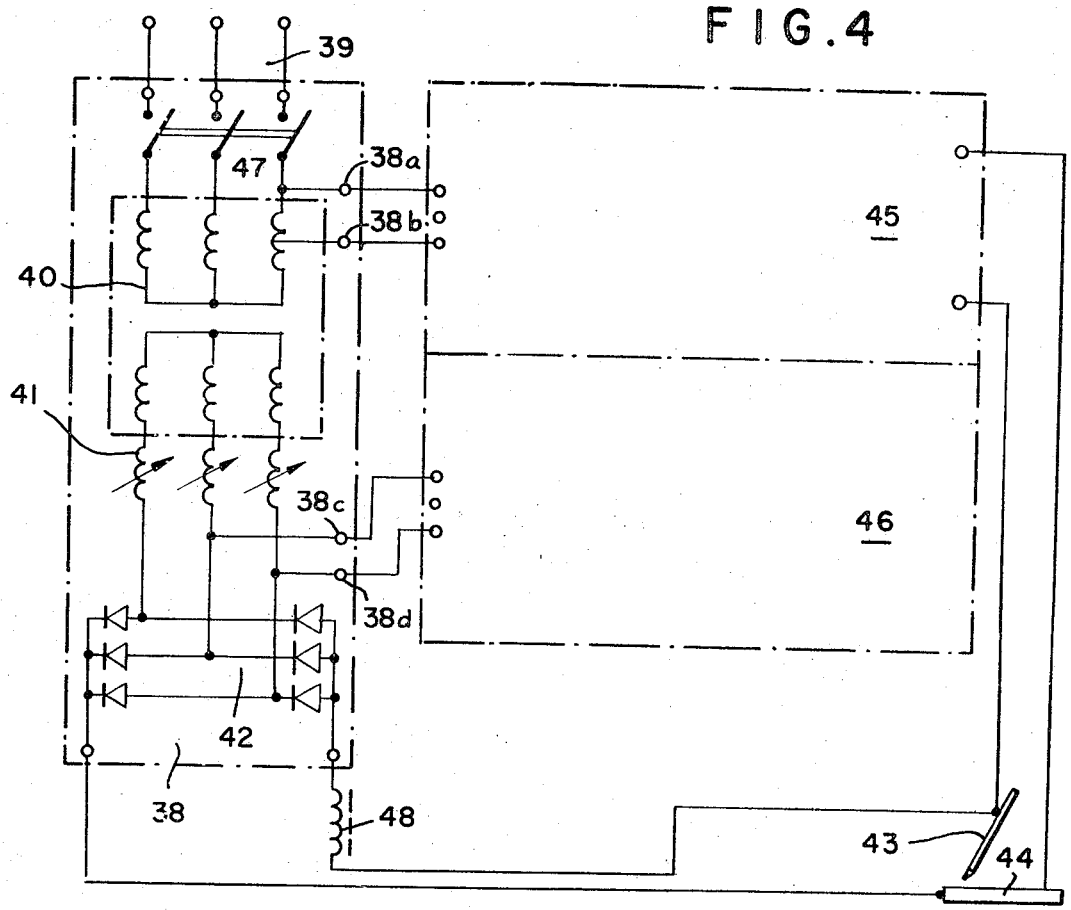
FIG. 4 is a circuit diagram showing the application of the present invention to the ignition of a direct current welding arc.

Aside from the stabilization and ignition of an alternating current welding arc as has been described above, the present system may be used to ignite a direct current arc solely with a modification of the source as shown in FIG. 4. In FIG. 4, the units 45 and 46 are to be considered identical to the pulse forming circuit 4 and the triggering circuit 5 described in connection with FIG. 1. In this system, however, a welding current source 38 replaces the source 1 and comprises a three-phase line connection 39 whose switch 47 energizes the three-phase transformer 40 represented diagrammatically. A plurality of saturable reactors for adjustable chokes 41 are connected in series with the three-phase transformer 40 between the latter and a full wave rectifier bridge 42 connected in the usual manner to the electrode 43 and the workpiece 44. The terminals 38a and 38b tap a portion of the input to the transformer 40 off to provide the input for transformer 11. The detecting transformer 29 is connected to the terminal 38c and 38d bridged across two of the phase output reactors 41. The system illustrated in FIG. 4 has the significant advantage that with direct current welding sources with falling characteristic, the control element operates only upon ignition and as a consequence of the low voltage developed across the breakdown device 31, the system does not apply control pulses except when reignition is required and complete extinction of the arc has occurred. The ignition operation is carried out as previously described.

The present process for stabilizing and igniting welding arcs should not be construed in a narrow sense and is intended to include arc-welding with or without protective gases, with destructible or indestructible (consumable or nonconsumable) electrodes, submerged arc-welding, arc deposition coating, and the like. It also applies to arc cutting, plasma welding, plasma coating, plasma cutting, plasma planing and plasma spray deposition. In plasma systems, the plasma stream may be considered equivalent to the arc described.

The improvement described and illustrated is believed to admit of many modifications within the ability of persons skilled in the art, all such modifications being considered within the spirit and scope of the invention except as limited by the appended claims.

We claim:

1. A system for the stabilization and ignition of an arc generated across an arc gap by the application of an arc forming current thereacross from a source of alternating current, said system comprising a pulse generating circuit connected across said gap and including a primary storage capacitor, means for charging said primary storage capacitor, a discharge circuit for said primary storage capacitor connected across said gap, and a triggerable semiconductor switch in series with said primary storage capacitor and enabling the charging thereof in a nonconductive condition of said switch and discharging said capacitor in a conductive condition of said switch to apply a pulse across said gap; and a triggering circuit connected with said source and with said switch for triggering same to apply said pulse across said gap, said discharge circuit including a stepup transformer having a secondary winding connected across said gap, and a primary winding connected in series with said switch and said primary storage capacitor, said triggering means including a detector transformer having a primary winding energized by said source and a secondary winding, a secondary storage capacitor connected across said secondary winding of said detector transformer, an adjustable charging resistor between said secondary winding of said detector transformer and said secondary capacitor, and a secondary discharge circuit for said secondary capacitor producing controlled pulses for said switch, said secondary discharge circuit comprising a pulse transformer having a primary winding and a secondary winding, a voltage-responsive breakdown device connected in series with said secondary capacitor and the primary winding of said pulse transformer, a time-constant network for quenching said breakdown device upon the elapse of a predetermined conductive interval thereof, and rectifier means energized by the secondary winding of said pulse transformer and connected with said switch for triggering same.

2. The system defined in claim 1 wherein said switch is a solid-state controlled rectifier having its gate connected to said rectifier means.

3. The system defined in claim 2 wherein said time-constant network includes a condenser connected between said secondary capacitor and said breakdown device and a resistor shunting said condenser.

4. The system defined in claim 2, further comprising a direct current-blocking isolating condenser in circuit with the primary winding of said detector transformer between the latter and said source.

5. The system defined in claim 2, further comprising an iron-core choke connected between said source and said gap.

6. The system defined in claim 2 wherein said breakdown device is a glow tube.

7. The system defined in claim 1 wherein said discharge circuit further comprises a diode bridged across said primary winding of said stepup transformer, said switch being a solid-state controlled rectifier.

8. The system defined in claim 1 wherein said means for charging said primary storage capacitor includes direct current input means connected across said primary storage capacitor and a choke connected in series with said primary storage capacitor and to said input means.

9. The system defined in claim 8 wherein said input means includes an isolating transformer having a primary winding connected across said source and a secondary winding, rectifier means connected to said secondary winding of said isolating transformer and said primary storage capacitor and filter means between said rectifier means and said primary storage capacitor.

10. A system for the stabilization of an alternating current welding or plasma arc and for the ignition of an alternating current or direct current welding or plasma arc generated across the arc gap produced at least in part by an electric source having an output with a zero-passage and for generating a pulse superimposable upon the arc gap for a duration of 0.8 to 20 microseconds and adapted to induce the formation of said arc in the cadence of the mains voltage, at ignition on the turning point and at welding in said zero-passage, said system comprising:
a pulse generating circuit connected across said gap and including a primary storage capacitor, means for charging said storage capacitor, a discharge circuit for said storage capacitor connected across said gap, and a triggerable semiconductor used as quick break switch in series with said storage capacitor and enabling the charging thereof in a nonconductive condition of said switch and discharging said storage capacitor in a conductive condition of said switch to apply a pulse across said gap; and
a triggering circuit connected with the output of said source and with said switch for triggering said switch to apply said pulse across said gap comprising a secondary storage capacitor, means for charging said secondary capacitor and a secondary discharge circuit for said secondary capacitor producing controlled pulses for said switch, said secondary discharge circuit comprising a voltage responsive breakdown device connected in series with said secondary capacitor and an assembly for quenching of said breakdown device upon the elapse of a predetermined conductive interval thereof, and rectifier means connected with said switch for triggering same, said triggering circuit including a pulse transformer having a primary winding connected in series with said secondary capacitor and with said breakdown device and a secondary winding energizing said rectifier means.

11. The system defined in claim 10 wherein said switch is a silicon controlled rectifier having its gate connected to said rectifier means.

12. The system defined in claim 10 wherein said discharge circuit includes a stepup transformer having a secondary winding connected across said gap, a primary winding connected in series with said switch and said primary storage capacitor, and a freewheeling rectifier bridged across said primary winding.

13. The system defined in claim 12 wherein said triggering circuit further includes a detector transformer having a primary winding energized by said source and a secondary winding connected with said secondary capacitor.

14. The system defined in claim 10 wherein said quenching assembly is a time-constant network including a further capacitor connected between said secondary capacitor and said breakdown device and a resistor shunting said further capacitor.

15. The system defined in claim 10, further comprising a coupling capacitor in circuit with the primary winding of said detector transformer between the latter and said source.

16. The system defined in claim 10, further comprising an iron-core choke connected between said source and said gap.

17. The system defined in claim 10 wherein said breakdown device is a glow tube.